(12) United States Patent
Takenaga et al.

(10) Patent No.: US 8,718,468 B2
(45) Date of Patent: May 6, 2014

(54) OPTICAL FIBER COMMUNICATION SYSTEM

(75) Inventors: Katsuhiro Takenaga, Sakura (JP); Ning Guan, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 13/344,942

(22) Filed: Jan. 6, 2012

(65) Prior Publication Data

US 2012/0163801 A1    Jun. 28, 2012

Related U.S. Application Data (63) Continuation of application No. PCT/JP2010/061525, filed on Jul. 7, 2010.

(30) Foreign Application Priority Data

Jul. 8, 2009    (JP) ................................. 2009-161452

(51) Int. Cl.
*H04B 17/00* (2006.01)

(52) U.S. Cl.
USPC ............. 398/16; 398/142; 385/126; 356/73.1

(58) Field of Classification Search
USPC ................................. 398/16, 140, 142, 13, 32
See application file for complete search history.

(56) References Cited

U.S. PATENT DOCUMENTS

| | | | | |
|---|---|---|---|---|
| 5,353,147 | A * | 10/1994 | Grimes ........................... | 398/28 |
| 7,076,164 | B2 * | 7/2006 | Carrick et al. .................. | 398/32 |
| 2004/0017785 | A1 | 1/2004 | Zelst | |
| 2007/0072646 | A1 | 3/2007 | Kuwahara et al. | |
| 2009/0220239 | A1 | 9/2009 | Armstrong et al. | |
| 2010/0329671 | A1 * | 12/2010 | Essiambre et al. ............. | 398/44 |

FOREIGN PATENT DOCUMENTS

| | | |
|---|---|---|
| JP | 10-227928 A | 8/1998 |
| JP | 2004-056821 A | 2/2004 |
| JP | 2007-096775 A | 4/2007 |
| JP | 2009-507405 A | 2/2009 |
| JP | 2009-268029 A | 11/2009 |

OTHER PUBLICATIONS

Paschotta, Wayback Machine—Encyclopedia of Laser Physics and Technology, Entry: Propogation constant, updated Apr. 15, 2006, crawled on May 21, 2006, retrieved on Jul. 22, 2013, retrieved from <URL: http://web.archive.org/web/20060528052146/http://www.rp-photonics.com/propagation_constant.html>, 1 page.*

(Continued)

*Primary Examiner* — Ken Vanderpuye
*Assistant Examiner* — David Lambert
(74) *Attorney, Agent, or Firm* — Westerman, Hattori, Daniels & Adrian, LLP

(57) ABSTRACT

There is provided an optical fiber communication system restricting enlargement of the diameter of an optical fiber as well as enabling achievement of a large-capacity optical communication with a small number of optical fibers.
An optical fiber communication system 100 includes an optical transmitter 10 transmitting a plurality of optical signals in parallel, a multicore fiber 20 in which outer circumferences of a plurality of cores are covered with a common clad, and the respective optical signals transmitted in parallel from the optical transmitter 10 are input into the cores, and an optical receiver 30 receiving the optical signals output in parallel from the respective cores of the multicore fiber, wherein the optical transmitter 10 and the optical receiver 30 perform a MIMO communication.

9 Claims, 3 Drawing Sheets

(56) References Cited

OTHER PUBLICATIONS

M. Koshiba et al. "Heterogeneous multi-core fibers: proposal and design principle", IEICE Electronics Express, 2009, vol. 6, No. 2, pp. 98-103.

Multiple Antennas and Space-Time Communications, pp. 321-335.
International Search Report of PCT/JP2010/061525, mailing date Sep. 28, 2010.

* cited by examiner

OPTICAL FIBER COMMUNICATION SYSTEM

TECHNICAL FIELD

The present invention relates to an optical fiber communication system.

BACKGROUND ART

Currently, an optical fiber used in a popularized optical fiber communication system has a configuration in which the outer circumference of a core is covered with a clad, and an optical signal is propagated in the core to cause information to be transmitted. In recent years, along with the popularization of the optical fiber communication system, the amount of information to be transmitted by the optical fiber drastically increases. In response to such increase in amount of information to be transmitted, as many as tens to hundreds of optical fibers are used in the optical fiber communication system to perform a large-capacity optical communication.

In order to reduce the number of optical fibers in the optical fiber communication system, it is known that a multicore fiber, in which the outer circumferences of a plurality of cores are covered with a clad, is used to transmit a plurality of signals by light propagated in the respective cores.

Non-Patent Document 1 shown below describes such a multicore fiber. However, according to Non-Patent Document 1 shown below, in an optical fiber in which a plurality of cores are formed in a clad, there is a case in which the cores are optically connected to one another, which results in mutual interference among optical signals propagated in the cores. It is said that effective ways to restrict such interference of the optical signals are enlarging the distances among the cores to prevent optical connection among the cores, heightening the refractive indexes of the cores against the clad to concentrate light on the cores, and making the refractive indexes of the adjacent cores different to prevent optical connection among the cores. Further, according to Non-Patent Document 1 shown below, in a case of a multicore fiber using a plurality of cores whose refractive index difference against the clad is 0.35%, optical interference can be restricted to be small when the center-to-center distance of the cores is 70 μm or larger, and in a case where the adjacent cores have different refractive indexes from one another, optical interference can be restricted to be small when the center-to-center distance of the cores is 35 μm or larger (Non-Patent Document 1).

CITATION LIST

Non-Patent Document

Non-Patent Document 1: Masanori KOSHIBA "Heterogeneous multi-core fibers: proposal and design principle" IEICE Electronics Express, Vol. 6, No. 2

SUMMARY OF THE INVENTION

Objects to be Achieved by the Invention

It is true that, by using the multicore fiber described in Non-Patent Document 1 shown above in the optical fiber communication system that performs the large-capacity optical communication, the number of optical fibers can be reduced. However, in a case where the center-to-center distance of the cores is enlarged in the multicore fiber, the diameter of the clad is inevitably enlarged. When the diameter of the clad is enlarged in this manner, the reduction in the number of optical fibers in the optical fiber communication system becomes meaningless, and additionally, the multicore fiber is not flexible, which causes a problem in which a place to install the multicore fiber is limited in some cases.

It is an object of the present invention to provide an optical fiber communication system restricting enlargement of the diameter of an optical fiber as well as enabling achievement of a large-capacity optical communication with a small number of optical fibers.

Means for Achieving the Objects

An optical fiber communication system according to the present invention includes an optical transmitter transmitting a plurality of optical signals in parallel, a multicore fiber in which outer circumferences of a plurality of cores are covered with a common clad, and the respective optical signals transmitted in parallel from the optical transmitter are input into the cores, and an optical receiver receiving the optical signals output in parallel from the respective cores of the multicore fiber, wherein the optical transmitter and the optical receiver perform a MIMO (Multi-Input Multi-Output) communication.

In such an optical fiber communication system, optical signals transmitted in parallel from the optical transmitter are received at the optical receiver via the respective cores of the multicore fiber to cause an optical communication by optical signals to be performed. At this time, in the multicore fiber, the optical signals transmitted in parallel may interfere with one another due to optical connection among the respective cores. However, since the optical transmitter and the optical receiver perform the MIMO communication, signals that are supposed to be transmitted from the optical transmitter are output from the optical receiver even in the case where the optical signals interfere with one another in the multicore fiber. Accordingly, since the mutual interference among the optical signals transmitted in parallel is allowed in the multicore fiber, the center-to-center distance of the respective cores of the multicore fiber can be small. Thus, in such an optical fiber communication system, since the number of optical fibers can be reduced by using the multicore fiber, a large-capacity optical communication can be achieved with a small number of optical fibers, and enlargement of the diameter of the multicore fiber as an optical fiber can be restricted.

Further, in the optical fiber communication system, only the optical receiver preferably stores information of transmission path characteristics of the multicore fiber, and the optical receiver preferably obtains signals transmitted from the optical transmitter from the information of the transmission path characteristics and the received optical signals.

With such an optical fiber communication system, the configuration of the optical transmitter can be simplified.

Further, in the optical fiber communication system, the optical receiver preferably stores the information of the transmission path characteristics in advance.

With such an optical fiber communication system, the transmission path characteristics do not need to be generated at the time of using the optical fiber communication system, which enables reduction in a load of the optical receiver.

Alternatively, in the optical fiber communication system, the optical transmitter preferably transmits a known pilot signal, and the optical receiver preferably stores the information of the transmission path characteristics generated by comparison between a received pilot signal and the known pilot signal.

With such an optical fiber communication system, even in a case where the transmission path characteristics of the multicore fiber 20 change in accordance with an environment in which the multicore fiber is arranged, information of the changed transmission path characteristics is derived, and thus more accurate information of the transmission path characteristics of the multicore fiber 20 can be generated. Hence, a more accurate MIMO communication can be performed.

Further, in the optical fiber communication system, the information of the transmission path characteristics is preferably generated at the optical receiver.

With such an optical fiber communication system, a component that generates information of transmission path characteristics does not need to be provided newly in addition to the optical receiver, and the configuration of the optical fiber communication system can be simplified.

Further, in the optical fiber communication system, the optical transmitter and the optical receiver preferably store in common information of transmission path characteristics of the multicore fiber, the optical transmitter preferably transmits optical signals weighted for the respective plurality of cores with use of the information of the transmission path characteristics, and the optical receiver preferably obtains signals that are supposed to be transmitted in a case where the optical transmitter does not perform weighting for the respective plurality of cores from the information of the transmission path characteristics and the received optical signals.

With such an optical fiber communication system, since optical signals are transmitted by performing weighting for the respective cores of the multicore fiber in accordance with the transmission path characteristics of the multicore fiber, optical signals can be transmitted more efficiently.

Further, in the optical fiber communication system, the optical transmitter and the optical receiver preferably store the information of the transmission path characteristics in advance.

Alternatively, in the optical fiber communication system, the optical transmitter preferably transmits a known pilot signal, and the optical transmitter and the optical receiver preferably store the information of the transmission path characteristics generated by comparison between a received pilot signal and the known pilot signal.

Further, in the optical fiber communication system, the information of the transmission path characteristics is preferably generated at the optical receiver.

Further, in the optical fiber communication system, the plurality of cores are preferably arranged to be symmetric about a line passing a center on a cross-section perpendicular to a longitudinal direction of the multicore fiber.

With such an optical fiber communication system, the arrangement of the cores is equal on both end surfaces of the multicore fiber. Accordingly, in a case where a plurality of multicore fibers are connected in the longitudinal direction into one multicore fiber, the multicore fibers can be connected to one another regardless of which end portions of the multicore fibers are connected.

Further, in the optical fiber communication system, the adjacent cores of the multicore fiber preferably have different refractive indexes, and the adjacent cores of the multicore fiber preferably have different diameters.

With such an optical fiber communication system, optical connection among the adjacent cores is weakened, and mutual interference among the optical signals is less likely to occur. Accordingly, computation to obtain a signal transmitted from the optical transmitter becomes easier, which enables reduction in a computing load of the system.

Effects of the Invention

As described above, with the present invention, an optical fiber communication system restricting enlargement of the diameter of an optical fiber as well as enabling achievement of a large-capacity optical communication with a small number of optical fibers is provided.

EMBODIMENT OF THE INVENTION

Hereinafter, preferred embodiments of an optical fiber communication system according to the present invention will be described in details with reference to the drawings.

First Embodiment

Figure 1:
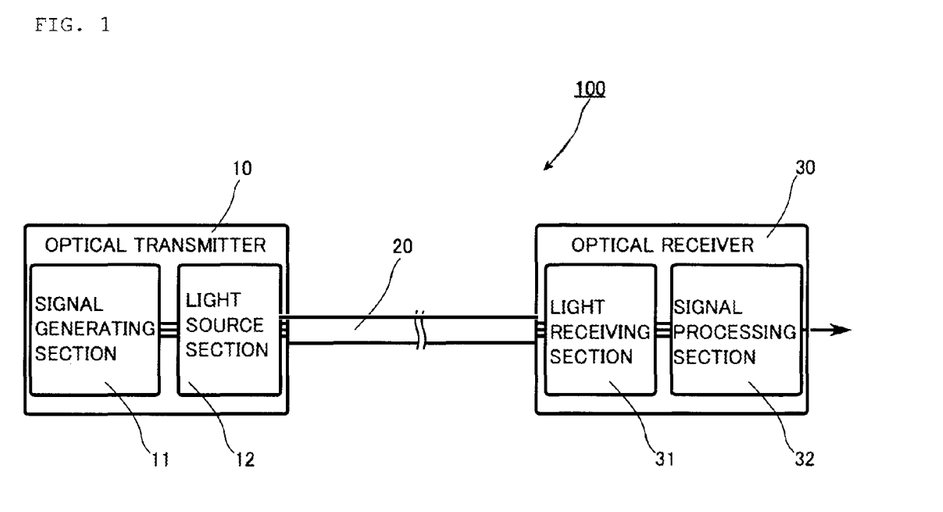
FIG. 1 illustrates an optical fiber communication system according to a first embodiment of the present invention.

First, a first embodiment of the present invention will be described with reference to FIG. 1. FIG. 1 illustrates an optical fiber communication system according to the present embodiment.

As illustrated in FIG. 1, an optical fiber communication system 100 includes an optical transmitter 10 transmitting optical signals, a multicore fiber 20 propagating the optical signals transmitted from the optical transmitter 10, and an optical receiver 30 receiving the optical signals propagated from the multicore fiber 20.

Figure 2:
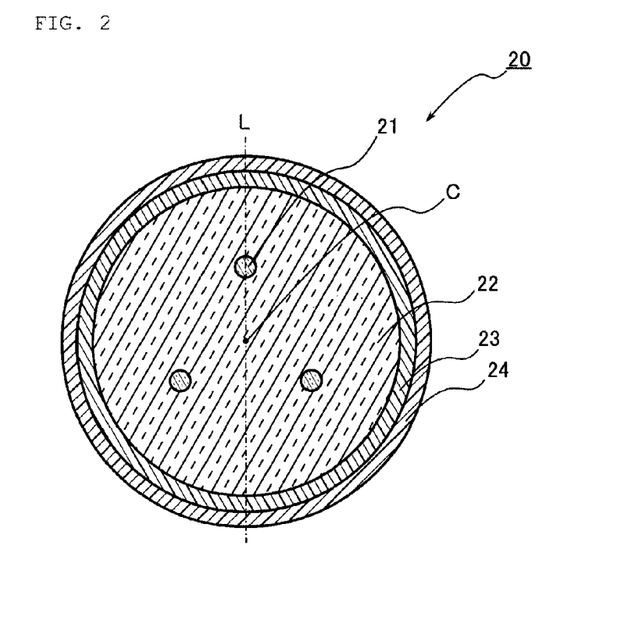
FIG. 2 is a cross-sectional view illustrating a structure in a cross-section perpendicular to a longitudinal direction of a multicore fiber in FIG. 1.

The multicore fiber 20 shown in FIG. 1 is first described. FIG. 2 is a cross-sectional view illustrating a structure in a cross-section perpendicular to a longitudinal direction of the multicore fiber 20 in FIG. 1. As illustrated in FIG. 2, the multicore fiber 20 includes a plurality of cores 21, a clad 22 covering the outer circumferences of the respective cores 21 and common to the respective cores 21, an inner protective layer 23 covering the outer circumference of the clad 22, and an outer protective layer 24 covering the outer circumference of the inner protective layer 23. It is to be noted that FIG. 2 shows a case in which three cores 21 are provided.

The plurality of cores 21 are arranged so that the adjacent cores may be equally distant, and the distances from a center C of the multicore fiber 20 to the respective cores 21 may be equal, in the cross-section of the multicore fiber 20. Further, the plurality of cores 21 are symmetric about a straight line L passing the center C of the multicore fiber 20 and extending in the radial direction.

In such a multicore fiber 20, the refractive indexes of the plurality of cores 21 are equal to one another, and the refractive index of the clad 22 is lower than the refractive indexes of the cores 21.

Further, although the size of each component of the multicore fiber 20 is not particularly limited since it is selected appropriately in accordance with the application, for example, the diameters of the cores 21 are equal to one another so as to be 4 μm to 10 μm each, the outside diameter of the clad 22 is 100 μm to 200 μm, the outside diameter of the inner protective layer 23 is 170 μm to 350 μm, and the outside diameter of the outer protective layer 24 is 230 μm to 400 μm. Further, the center-to-center distance of the cores 21 is 20 μm to 50 μm.

When optical signals are propagated into the respective cores 21 of the multicore fiber 20, the optical signals propagated into the respective cores 21 may interfere with one another, and the multicore fiber 20 has specific transmission path characteristics to have individual amplitude gains in the respective cores 21.

An example of a material forming the core 21 is quartz to which dopant heightening the refractive index is added. Examples of the dopant include germanium oxide ($GeO_2$) and aluminum oxide ($Al_2O_3$). Further, examples of a material forming the clad 22 are quartz to which no dopant is added and quartz to which dopant lowering the refractive index such as fluorine (F) is added. Further, an example of a material forming the inner protective layer 23 and the outer protective layer 24 is an ultraviolet curable resin such as acrylate.

Further, as illustrated in FIG. 1, one end of the multicore fiber 20 is connected to the optical transmitter 10 while the other end is connected to the optical receiver 30.

Next, the optical transmitter 10 and the optical receiver 30 will be described.

The optical transmitter 10 includes as main components a signal generating section 11 outputting a voltage signal by an instruction from an outside of the optical transmitter 10 and a light source section 12 outputting an optical signal corresponding to the voltage signal from the signal generating section 11.

The signal generating section 11 includes a control unit controlling the optical transmitter 10, a memory storing intensity of the optical signal output from the light source section 12, information of the transmission path characteristics of the multicore fiber 20, and the like as needed, a pulse generator generating a pulse as a base of the voltage signal to be output from the signal generating section 11, a serial/parallel signal converter, an amplifier, and the like, and outputs voltage signals in parallel by the instruction from the outside.

The light source section 12 includes a plurality of LDs (laser diodes) and optical amplifiers provided to correspond to the respective LDs and outputs a plurality of optical signals in parallel to correspond to the parallel voltage signals output from the signal generating section 11. Specifically, the respective voltage signals input in parallel from the signal generating section 11 are input in the plurality of LDs, and the respective LDs output the optical signals based on the input voltage signals. Subsequently, the optical signals output from the respective LDs are amplified in the optical amplifiers and are output in parallel from the light source section 12. Meanwhile, the light source section is connected to not-shown a plurality of optical couplers so that the respective optical signals output from the light source section 12 may be input in the respective cores 21 of the multicore fiber 20 shown in FIG. 1, and the plurality of optical couplers are connected to the respective cores 21 of the multicore fiber 20.

On the other hand, the optical receiver 30 shown in FIG. 1 includes as main components a light receiving section 31 receiving the optical signal input from the multicore fiber 20 and converting it into a voltage signal and a signal processing section 32 processing the voltage signal output from the light receiving section 31.

The light receiving section 31 includes a plurality of PDs (photodiodes) provided to correspond to the respective cores 21 of the multicore fiber 20 and converting the optical signals output from the cores 21 of the multicore fiber 20 into voltage signals, an amplifier amplifying the voltage signals output from the respective PDs to predetermined voltage, and the like. Accordingly, when the optical signals are output in parallel from the respective cores 21 of the multicore fiber 20, the voltage signals are output in parallel from the light receiving section 31.

The signal processing section 32 includes as main components an A/D converter sampling the voltage signals output from the light receiving section 31 and converting them into digital signals, a computing unit computing the A/D-converted signals and outputting the computing results as signals, a control unit controlling the optical receiver 30, and a memory storing information of the transmission path characteristics of the multicore fiber 20 and the like. When the voltage signals are input in parallel from the light receiving section 31, this signal processing section 32 processes these voltage signals and outputs the optical signals transmitted from the optical transmitter as electric signals.

Next, operations of the optical fiber communication system 100 configured as above will be described.

First, operations in a case where only the optical receiver 30 stores information of the transmission path characteristics of the multicore fiber 20 in advance will be described. Specifically, they are operations in a case where information of the transmission path characteristics is stored in the memory of the signal processing section 32.

A predetermined signal is first input from the outside of the optical transmitter 10 in the optical transmitter 10. When receiving the predetermined signal from the outside, the signal generating section 11 outputs voltage signals based on the predetermined signal in parallel to the light source section 12 so that optical signals based on the predetermined signal may be generated in parallel from the light source section 12. At this time, the voltage signals output in parallel to the light source section may be different from or equal to one another. The light source section 12 outputs optical signals in parallel from the plurality of LDs in the light source section 12 based on the voltage signals received from the signal generating section 11 and amplifies the optical signals by the optical amplifiers in the light source section 12. Subsequently, the amplified optical signals are output in parallel from the optical transmitter 10. In this manner, a plurality of optical signals are transmitted in parallel from the optical transmitter 10.

The optical signals output in parallel from the optical transmitter 10 are individually input in the respective cores 21 of the multicore fiber 20. The optical signals input in the respective cores 21 of the multicore fiber 20 are transmitted by the multicore fiber 20 and are input in the optical receiver 30. In this manner, the optical receiver 30 receives the optical signals.

In the optical receiver 30, voltage signals corresponding to the intensities of the optical signals input in parallel are output in parallel from the light receiving section 31 and are input in the signal processing section 32. In the signal processing section 32, the voltage signals input in parallel are computed to derive signals transmitted as optical signals from the optical transmitter 10.

This computing processing is performed in the following manner.

The memory in the signal processing section 32 stores information of the transmission path characteristics of the multicore fiber 20 in advance as described above. The information of the transmission path characteristics can be expressed as a determinant of matrix. For example, in a case where the multicore fiber 20 has three cores 21 as shown in FIG. 2, the respective cores 21 are referred to as core 1, core 2, and core 3. Optical signal $x_1$ is input in core 1 from the optical transmitter 10, optical signal $x_2$ is input in core 2, and optical signal $x_3$ is input in core 3. To the optical receiver 30, optical signal $y_1$ is output from core 1 of the multicore fiber 20, optical signal $y_2$ is output from core 2, and optical signal $y_3$ is output from core 3.

At this time, the relationship among optical signal x transmitted and output from the optical transmitter 10, information of the transmission path characteristics H, and optical signal y received at the optical receiver 30 is expressed as Equation (1) shown below.

$$y = Hx \quad (1)$$

Note that x, y, and H are expressed as Equations (2) to (4) shown below.

$$x = (x_1, x_2, x_3) \quad (2)$$

$$y = (y_1, y_2, y_3) \quad (3)$$

$$H = \begin{pmatrix} h_{11} & h_{12} & h_{13} \\ h_{21} & h_{22} & h_{23} \\ h_{31} & h_{32} & h_{33} \end{pmatrix} \quad (4)$$

Meanwhile, in the present embodiment, noise superposed in the multicore fiber 20 is not taken into consideration.

Since the optical receiver 30 stores information of the transmission path characteristics H of the multicore fiber 20 as described above, the signal processing section 32 can derive optical signal x transmitted from the optical transmitter 10 from information of the transmission path characteristics H and received optical signal y with use of Equation (1). The signal processing section 32 outputs optical signal x output from the optical transmitter 10 derived in this manner.

Thus, the optical transmitter 10 and the optical receiver 30 perform a MIMO (Multi-Input Multi-Output) communication. It is to be noted that, in the optical communication performed between the optical transmitter 10 and the optical receiver 30, a modulation method for optical signals is not particularly limited, and examples thereof can be OOK (On-Off Keying), PSK (Phase Shift Keying), QAM (Quadrature Amplitude Modulation), and OFDM (Orthogonal Frequency Divisional Multiplexing).

In the case where only the optical receiver 30 stores information of the transmission path characteristics of the multicore fiber 20 in this manner, the transmission path characteristics of the multicore fiber 20 do not need to be considered in the optical transmitter 10, and thus the configuration of the optical transmitter 10 can be simplified.

Next, operations in a case where the optical transmitter 10 and the optical receiver 30 store in common information of the transmission path characteristics of the multicore fiber in advance will be described. Meanwhile, duplicate description with the aforementioned operations in the case where only the optical receiver 30 stores information of the transmission path characteristics of the multicore fiber 20 in advance is omitted.

In this case, the memory in the signal generating section 11 of the optical transmitter 10 and the memory in the signal processing section 32 of the optical receiver 30 store information of the transmission path characteristics in advance.

First, on receiving a predetermined signal from the outside of the optical transmitter 10, the signal generating section 11 outputs voltage signals based on the predetermined signal in parallel to the light source section 12 so that optical signals based on the predetermined signal may be generated in parallel from the light source section 12. At this time, the signal generating section 11 weights respective voltage signals so that the light source section 12 may output not optical signals x that are supposed to be output from the light source section but optical signals individually weighted based on the information of the transmission path characteristics stored in the memory. The weighting is performed in the following manner.

Information of the transmission path characteristics H can undergo singular value decomposition as Equation (5) shown below.

$$H = V_r A V_t^T \quad (5)$$

Note that A is expressed as Equation (6) shown below.

$$A = \begin{pmatrix} \sqrt{\lambda_1} & 0 & 0 \\ 0 & \sqrt{\lambda_2} & 0 \\ 0 & 0 & \sqrt{\lambda_3} \end{pmatrix} \quad (6)$$

Note that $V_t$ is a weighting coefficient matrix in the optical transmitter 10, $V_r$ is a weighting coefficient matrix in the optical receiver 30, and T is a complex conjugate transposition. Further, $V_t$ and $V_r$ are unitary matrices satisfying Equations (7) and (8) shown below. Note that I is a unit matrix.

$$V_t^T V_t = I \quad (7)$$

$$V_r^T V_r = I \quad (8)$$

A square root of $\lambda_1$, a square root of $\lambda_2$, and a square root of $\lambda_3$ in A represent amplitude gains of core 1, core 2, and core 3, respectively. As for the amplitude gain, the higher the value of the square root of $\lambda_1$ is, the more optical signals core 1 can transmit. In a case where the value of the square root of $\lambda_1$ is low, core 1 cannot transmit optical signals very much. The same holds true for the square root of $\lambda_2$ and the square root of $\lambda_3$.

Figure 3:
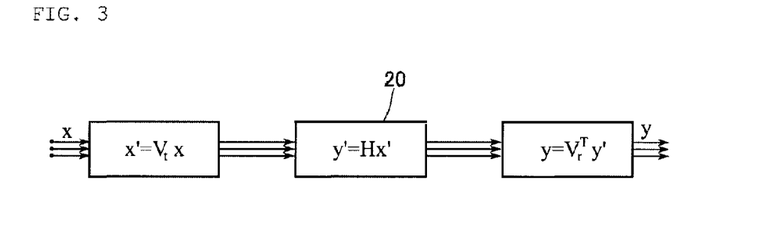
FIG. 3 illustrates a state in which each signal is weighted.

The signal generating section 11 weights respective voltage signals with use of coefficient matrix $V_t$ so that optical signals input in core 1, core 2, and core 3 may be individually weighted. FIG. 3 illustrates a state in which each signal is weighted. As for the weighting, the signal generating section 11 first weights each optical signal x that is supposed to be transmitted and output from the optical transmitter 10 in a manner of Equation (9) shown below as shown in FIG. 3.

$$x' = V_t x \quad (9)$$

The light source section 12 receives each voltage signal weighted in this manner, and from the light source section 12 is output not optical signal x that is supposed to be output but optical signal x' into which each optical signal has been individually weighted.

Subsequently, optical signal x' output from the optical transmitter 10 is influenced by the transmission path characteristics at the time of reaching the optical receiver 30. Accordingly, optical signal y' received at the optical receiver 30 is expressed as Equation (10) shown below.

$$y' = Hx' \quad (10)$$

Further, as shown in FIG. 3, in the optical receiver 30, the signal processing section 32 computes each voltage signal input from the light receiving section 31 with use of coefficient matrix $V_r$ in a manner of Equation (11) shown below to derive optical signal y, which is received at the optical receiver 30 in a case where optical signal x that is supposed to be output from the optical transmitter 10.

$$y = V_r^T y' \quad (11)$$

The signal processing section 32 thereafter derives and outputs with use of Equation (1) each optical signal x that is supposed to be output from the optical transmitter 10, that is, each signal that is supposed to be transmitted in a case where the optical transmitter 10 does not perform weighting for each of the plurality of cores 21. In this manner, even in the case where the optical transmitter 10 and the optical receiver 30 store in common information of the transmission path characteristics of the multicore fiber 20 in advance, the optical transmitter 10 and the optical receiver 30 perform the MIMO communication.

In the case where the optical transmitter 10 and the optical receiver 30 store in common information of the transmission path characteristics of the multicore fiber 20 in this manner, optical signals can be transmitted by performing weighting for the respective cores 21 of the multicore fiber 20, and thus optical signals can be transmitted more efficiently.

Meanwhile, a maximum transmission capacity in the case of the MIMO communication is given by Equation (12) shown below under the assumption that the transmission bandwidth, signal output, and noise are equal in all the cores.

$$C = \sum_i B \cdot \log_2\left(1 + \lambda_i \cdot \frac{S}{N}\right) \quad (12)$$

Note that C is a maximum transmission capacity, B is a transmission bandwidth in each core, S/N is a ratio of signal output and noise, and as for $\lambda_i$, a square root thereof represents an amplitude gain used in Equation (6) shown above. Under the condition of Equation (12), $\lambda_i=1$ in a case of a single core, which is known as Shannon's limit and is expressed as Equation (13) shown below.

$$C = B \cdot \log_2\left(1 + \frac{S}{N}\right) \quad (13)$$

As described above, with the optical fiber communication system 100 according to the present embodiment, optical signals transmitted in parallel from the optical transmitter 10 are received at the optical receiver 30 via the respective cores 21 of the multicore fiber 20 to cause an optical communication by optical signals to be performed. At this time, in the multicore fiber 20, the optical signals transmitted in parallel may interfere with one another due to optical connection among the respective cores 21. However, since the optical transmitter 10 and the optical receiver 30 perform the MIMO communication, signals that are supposed to be transmitted from the optical transmitter 10 are output from the optical receiver 30 even in the case where the optical signals interfere with one another in the multicore fiber 20. Accordingly, since the mutual interference among the optical signals transmitted in parallel is allowed in the multicore fiber 20, the center-to-center distance of the respective cores of the multicore fiber 20 can be small. Thus, in such an optical fiber communication system 100, since the number of optical fibers can be reduced by using the multicore fiber 20, a large-capacity optical communication can be achieved with a small number of optical fibers, and enlargement of the diameter of the multicore fiber 20 as an optical fiber can be restricted.

Further, since the optical fiber communication system 100 stores information of the transmission path characteristics of the multicore fiber 20 in advance, the transmission path characteristics do not need to be generated at the time of using the optical fiber communication system 100, which enables reduction in a load of the optical receiver 30.

Further, in the optical fiber communication system according to the present embodiment, since optical signals are transmitted by a plurality of cores separated physically, parallel optical signals can be input in the respective cores and output from the respective cores easily.

Second Embodiment

Figure 4:
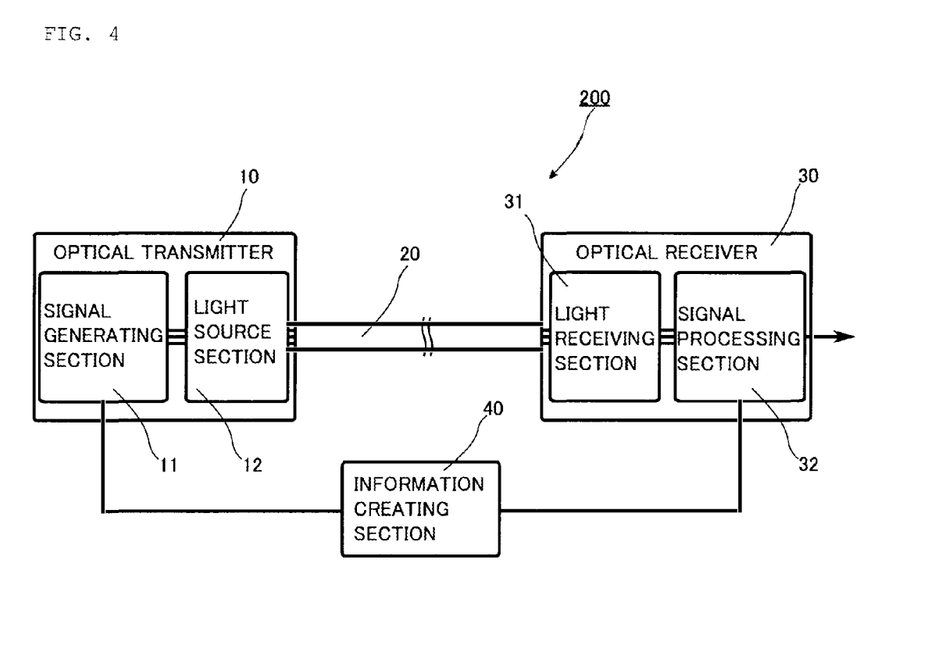
FIG. 4 illustrates an optical fiber communication system according to a second embodiment of the present invention.

Next, a second embodiment of the present invention will be described in details with reference to FIG. 4. It is to be noted that similar or identical components to those in the first embodiment are shown with the same reference numerals, and description of the duplicate components is omitted. FIG. 4 illustrates an optical fiber communication system according to the present embodiment.

As illustrated in FIG. 4, an optical fiber communication system 200 in the present embodiment differs from the optical fiber communication system 100 in the first embodiment in terms of having an information creating section 40.

The information creating section 40 is connected to the signal generating section 11 of the optical transmitter 10 and the signal processing section 32 of the optical receiver 30. The information creating section 40 has a memory and a computing unit and generates information of the transmission path characteristics of the multicore fiber 20.

Further, in the optical fiber communication system 200 in the present embodiment, the optical transmitter 10 and the optical receiver 30 do not store information of the transmission path characteristics of the multicore fiber 20 in advance.

Operations of the optical fiber communication system 200 are as follows.

First, information on a pilot signal stored in the memory of the information creating section 40 is output to the signal generating section 11 of the optical transmitter 10. When the information on the pilot signal is input, the signal generating section 11 outputs a voltage signal to the light source section 12 so that a pilot signal may be output from the light source section 12 based on this information. When the voltage signal is input, the light source section 12 outputs an optical signal as a pilot signal. In this manner, a pilot signal is transmitted from the optical transmitter 10.

In the optical receiver 30, when the pilot signal is received, the signal processing section 32 outputs the received pilot signal as an electric signal to the information creating section 40.

When the pilot signal is input from the optical receiver 30, the information creating section 40 compares the pilot signal stored in the memory and the pilot signal input from the optical receiver 30. Subsequently, the information creating section 40 derives information of the transmission path characteristics of the multicore fiber 20 from the two pilot signals by computation.

Subsequently, in a case where only the optical receiver is to store information of the transmission path characteristics, the information creating section 40 outputs the derived information of the transmission path characteristics to the optical receiver 30, and the signal processing section 32 of the optical receiver 30 stores the information of the transmission path characteristics in the memory.

Thereafter, the optical transmitter 10 and the optical receiver 30 perform the MIMO communication in a similar manner to the aforementioned operations in the case where only the optical receiver 30 stores information of the transmission path characteristics of the multicore fiber 20 in advance.

On the other hand, in a case where the optical transmitter 10 and the optical receiver 30 are to store in common information of the transmission path characteristics, the information creating section 40 outputs the derived information of the transmission path characteristics to the optical transmitter 10 and the optical receiver 30, and the signal generating section 11 of the optical transmitter 10 and the signal processing section 32 of the optical receiver 30 store the information of the transmission path characteristics in the memories.

Thereafter, the optical transmitter 10 and the optical receiver 30 perform the MIMO communication in a similar manner to the aforementioned operations in the case where the optical transmitter 10 and the optical receiver 30 store in common information of the transmission path characteristics of the multicore fiber 20 in advance.

With the optical fiber communication system 200 in the present embodiment, even in a case where the transmission path characteristics of the multicore fiber 20 change in accordance with an environment in which the multicore fiber 20 is arranged, information of the changed transmission path characteristics is derived, and thus more accurate information of the transmission path characteristics of the multicore fiber 20 can be generated. Hence, a more accurate MIMO communication can be performed.

Third Embodiment

Figure 5:
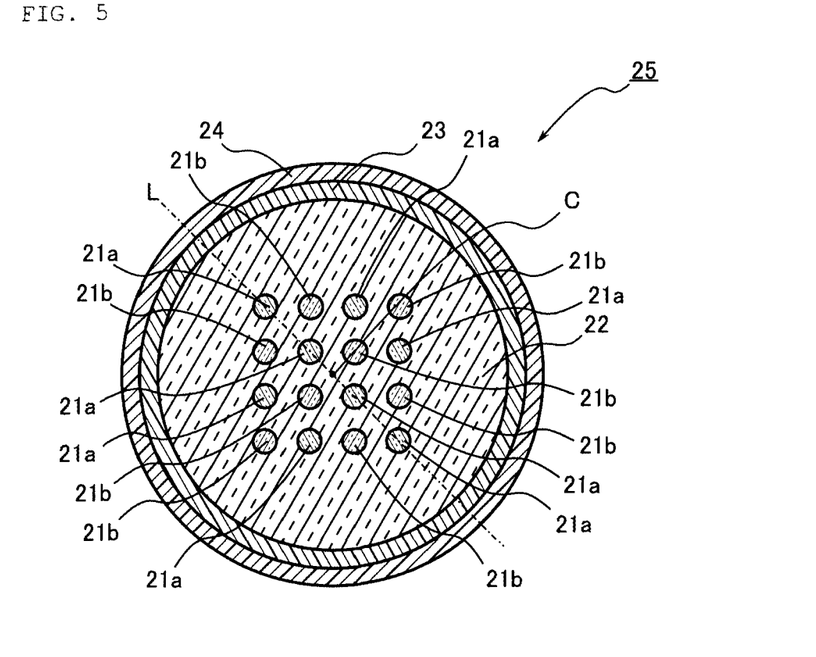
FIG. 5 illustrates a structure in a cross-section perpendicular to a longitudinal direction of a multicore fiber used in an optical fiber communication system according to a third embodiment of the present invention.

Next, a third embodiment of the present invention will be described in details with reference to FIG. 5. It is to be noted that similar or identical components to those in the first embodiment are shown with the same reference numerals, and description of the duplicate components is omitted. FIG. 5 illustrates a structure in a cross-section perpendicular to a longitudinal direction of a multicore fiber used in an optical fiber communication system according to the present embodiment.

The optical fiber communication system in the present embodiment differs from the first embodiment in terms of using a multicore fiber 25 instead of the multicore fiber 20.

As illustrated in FIG. 5, the multicore fiber 25 has a plurality of cores, and the plurality of cores are arranged so that squares may be drawn by lines connecting centers of the adjacent cores on the cross-section perpendicular to the longitudinal direction of the multicore fiber 25. Further, the plurality of cores include two kinds of cores, cores 21a and cores 21b, having different refractive indexes from each other. Further, the cores 21a and the cores 21b are arranged alternately. In other words, in the multicore fiber 25, the cores are arranged so that the adjacent cores may have different refractive indexes from one another. Further, in the present embodiment, the refractive indexes of the cores 21a are higher than the refractive indexes of the cores 21b. It is to be noted that FIG. 5 shows a case in which eight cores 21a and eight cores 21b are provided.

Further, the cores 21a and the cores 21b are arranged to be symmetric about the straight line L passing the center C on the cross-section of the multicore fiber 25.

The diameter of each of such cores 21a and cores 21b is similar to the diameter of each of the cores 21 in the first embodiment, and the center-to-center distance between the core 21a and the core 21b is 15 μm to 40 μm. Further, an example of a material forming the core 21a or the core 21b is quartz to which dopant heightening the refractive index is added, and more dopant is added to the core 21a. Examples of the dopant are similar to the examples of the dopant for the core 21 of the multicore fiber 20 in the first embodiment.

With the optical fiber communication system in the present embodiment, optical connection between the core 21a and the core 21b is weakened, and an optical signal propagated in the core 21a and an optical signal propagated in the core 21b are less likely to interfere with each other. Accordingly, computation to obtain a signal transmitted from the optical transmitter 10 becomes easier, which enables reduction in a computing load of the optical fiber communication system.

Although the present invention has been described above taking the first to third embodiments as examples, the present invention is not limited to these.

For example, in the first to third embodiments, the diameters of the respective cores in the multicore fiber are equal to one another. However, the present invention is not limited to this, and the diameters of the adjacent cores in the multicore fiber may be different from one another. In this case, optical connection among the respective cores is weakened, and optical signals are less likely to interfere with one another. Accordingly, computation to obtain a signal transmitted from the optical transmitter 10 becomes easier, which enables reduction in a computing load of the optical fiber communication system. For example, in a case where the diameter of each core is 4 μm to 10 μm as in the foregoing description, when the difference between the diameters of the adjacent cores is under the condition that a ratio ($\delta d/d_{ave}$) between a difference between the diameters of the adjacent cores ($\delta d$) and an average diameter ($d_{ave}$) is within 0.1% to 5%, optical connection among the respective cores can be weakened with almost no influence on the characteristics of the respective cores.

Further, although the case in which the number of cores 21 of the multicore fiber 20 is three has been shown in the first and second embodiments, the present invention is not limited to this, and the number of cores may be two or four or more as long as it is plural.

Figure 6:
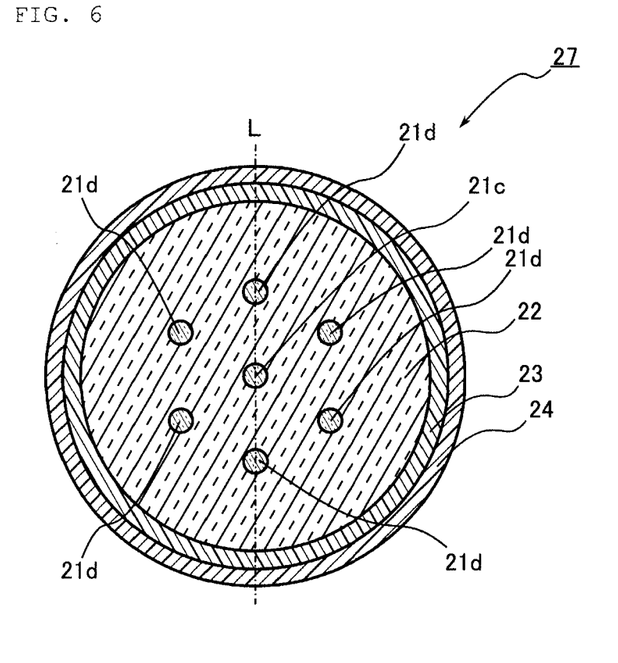
FIG. 6 illustrates a modification example of the multicore fiber in the first embodiment.

Such an example in which four or more cores are provided will be described with reference to FIG. 6. FIG. 6 illustrates a modification example of the multicore fiber 20 in the first embodiment. It is to be noted that, in the present modification example, similar or identical components to those in the first embodiment are shown with the same reference numerals, and description of the duplicate components is omitted. As illustrated in FIG. 6, a multicore fiber 27 includes a plurality of cores 21, a clad 22 covering the outer circumferences of the respective cores 21, an inner protective layer 23 covering the outer circumference of the clad 22, and an outer protective layer 24 covering the outer circumference of the inner protective layer 23, and FIG. 6 shows a case in which seven cores 21 are provided. As for the plurality of cores, one core 21c is arranged at the center of the multicore fiber 27 while the other cores 21d are arranged around the core 21c on the cross-section of the multicore fiber 27. Further, the respective cores are arranged so that the center-to-center distances between the cores 21d may be equal and so that the center-to-center distance between each core 21d and the core 21c and the center-to-center distance between the cores 21d may be equal. Meanwhile, the refractive index, material, and the like of each of the cores 21c and 21d are similar to those of each of the cores 21 in the multicore fiber 20 in the first embodiment.

Further, in the above modification example, the core 21c and the cores 21d may have different refractive indexes. In this case, the cores 21d may have two kinds of refractive indexes and may be arranged so that the adjacent cores 21d may have different refractive indexes. Further, the core 21c and the cores 21d may have different diameters, and in this case, the cores 21d may have two sizes of diameters and may be arranged so that the adjacent cores 21d may have different diameters.

Further, although, in the third embodiment, the multicore fiber 25 is used instead of the multicore fiber 20 in the first embodiment, the multicore fiber 25 may be used instead of the multicore fiber 20 in the second embodiment.

Further, although, in the first embodiment, the light source section 12 is configured so that optical signals output from the plurality of LDs (laser diodes) may be input in the respective cores 21 of the multicore fiber 20, the present invention is not limited to this. For example, an optical signal output from one LD may be bifurcated to correspond to the respective cores 21, and the respective bifurcated optical signals may thereafter be input via separate modulators in the cores 21 of the multicore fiber 20.

Further, although, in the second embodiment, the information creating section 40 is provided separately from the optical receiver 30, the information creating section 40 may be provided in the optical receiver 30. In this case, the memory of the information creating section 40 and the memory in the signal processing section 32 of the optical receiver 30 can be unified, and moreover the computing unit of the information creating section 40 and the computing unit in the signal processing section 32 can be unified. Hence, the configuration of the optical fiber communication system can be simplified.

Further, in the optical fiber communication systems in the first to third embodiments, a plurality of multicore fibers may be used.

EXAMPLES

Hereinafter, the present invention will be described more specifically with examples and comparative examples, but the present invention is not limited to these.

Example 1

In the optical fiber communication system described in the first embodiment, the maximum transmission capacity was calculated and derived by Equation (12) shown above. At this time, common parameters were applied to the three cores. The diameter of each core was set to 6 μm, the relative refractive index difference of each core against the clad was set to 0.7%, the center-to-center distance of the cores was set to 50 μm, and the outside diameter of the clad was set to 125 μm. Further, the transmission distance (length of the multi-core fiber) was set to 80 km, and the wavelength of an optical signal to be transmitted was set to 1550 nm. Under such conditions, the crosstalk amount among the cores (connecting amount of optical power) was 0.0368 (−14.3 dB), and Equation (4), representing information of the transmission path characteristics H described above, was in a manner of Equation (14) shown below. Meanwhile, an off-diagonal element of matrix H shown below is a square root of the optical power connecting amount among the respective cores, and a diagonal element is a value derived by subtracting the sum of squares of the off-diagonal elements in each row from 1 and taking the square root.

$$H = \begin{pmatrix} 0.9625 & 0.1918 & 0.1918 \\ 0.1918 & 0.9625 & 0.1918 \\ 0.1918 & 0.1918 & 0.9625 \end{pmatrix} \quad (14)$$

When this determinant of matrix underwent singular value decomposition as Equation (5) shown above, matrix A, representing amplitude gains in Equation (6) shown above, was in the following manner.

$$A = \begin{pmatrix} 1.35 & 0 & 0 \\ 0 & 0.77 & 0 \\ 0 & 0 & 0.77 \end{pmatrix} \quad (15)$$

When transmission bandwidth B of each core was set to 100 GHz, and ratio S/N of signal output and noise of each core in the aforementioned transmission distance was set to 20 (13 dB), maximum transmission capacity C was approximately 1259 Gbps by Equation (12) shown above.

In a single-core fiber similar to one in Example 1 except for having one core, when the transmission distance, transmission bandwidth, and ratio of signal output and noise are similar to those in Example 1, the maximum transmission capacity is 439 Gbps by Equation (13) shown above. Accordingly, it was found that the transmission capacity could be drastically increased in the optical fiber communication system using the multicore fiber in Example 1.

Subsequently, calculation was performed with the wavelength of the optical signal to be transmitted set to 1310 nm. Under such conditions, the crosstalk amount was $1.1 \times 10^{-7}$ (−69.6 dB), information of the transmission path characteristics H was in a manner of Equation (16) shown below, and matrix A, representing amplitude gains, was in a manner of Equation (17) shown below.

$$H = \begin{pmatrix} 0.9999999 & 0.00033 & 0.00033 \\ 0.00033 & 0.9999999 & 0.00033 \\ 0.00033 & 0.00033 & 0.9999999 \end{pmatrix} \quad (16)$$

$$A = \begin{pmatrix} 1.001 & 0 & 0 \\ 0 & 0.9997 & 0 \\ 0 & 0 & 0.9997 \end{pmatrix} \quad (17)$$

In a similar manner to that in the case where the wavelength of the optical signal to be transmitted was 1550 nm, when transmission bandwidth B of each core was set to 100 GHz, and ratio S/N of signal output and noise of each core in the aforementioned transmission distance was set to 20 (13 dB), maximum transmission capacity C was approximately 1318 Gbps by Equation (12) shown above.

As described above, in the single-core fiber similar to one in Example 1 except for having one core, when the transmission distance, transmission bandwidth, and ratio of signal output and noise are similar to those in Example 1, the maximum transmission capacity is 439 Gbps. Accordingly, it was found that, even in the case where the wavelength of the optical signal to be transmitted was set to 1310 nm, the transmission capacity could be drastically increased in the optical fiber communication system using the multicore fiber in Example 1.

Subsequently, calculation was performed with the wavelength of the optical signal to be transmitted set to 1600 nm. Under such conditions, the crosstalk amount was 0.2884 (−5.4 dB), information of the transmission path characteristics H was in a manner of Equation (18) shown below, and matrix A, representing amplitude gains, was in a manner of Equation (19) shown below.

$$H = \begin{pmatrix} 0.6505 & 0.5371 & 0.5371 \\ 0.5371 & 0.6505 & 0.5371 \\ 0.5371 & 0.5371 & 0.6505 \end{pmatrix} \quad (18)$$

$$A = \begin{pmatrix} 1.725 & 0 & 0 \\ 0 & 0.113 & 0 \\ 0 & 0 & 0.113 \end{pmatrix} \quad (19)$$

In a similar manner to that in the case where the wavelength of the optical signal to be transmitted was 1550 nm, when transmission bandwidth B of each core was set to 100 GHz, and ratio S/N of signal output and noise of each core in the aforementioned transmission distance was set to 20 (13 dB), maximum transmission capacity C was approximately 658 Gbps by Equation (12) shown above.

As described above, in the single-core fiber similar to one in Example 1 except for having one core, when the transmission distance, transmission bandwidth, and ratio of signal output and noise are similar to those in Example 1, the maximum transmission capacity is 439 Gbps. Accordingly, it was found that, even in the case where the wavelength of the optical signal to be transmitted was set to 1600 nm, the transmission capacity could be drastically increased in the optical fiber communication system using the multicore fiber in Example 1.

Example 2

In a case where the multicore fiber described with reference to FIG. 6 was applied to the optical fiber communication system in the first embodiment, the maximum transmission capacity was calculated and derived by Equation (12) shown above. At this time, common parameters were applied to the cores except for setting the diameter of the center core to 6 μm and arranging two kinds of cores having diameters of 5.94 μm and 6.06 μm around the center core alternately. The relative refractive index difference of each core against the clad was set to 0.7%, the center-to-center distance of the cores was set to 30 μm, and the outside diameter of the clad was set to 125 μm. Further, the transmission distance (length of the multicore fiber) was set to 40 km, and the wavelength of an optical signal to be transmitted was set to 1550 nm. Under such conditions, the crosstalk amount among the cores was 0.083 (−10.8 dB) between the most proximate cores and −100 dB or less between the second and third proximate cores, which were negligible levels. Equation (4), representing information of the transmission path characteristics H described above, was in a manner of Equation (20) shown below. Meanwhile, in the present example as well, an off-diagonal element of matrix H shown below is a square root of the optical power connecting amount among the respective cores, and a diagonal element is a value derived by subtracting the sum of squares of the off-diagonal elements in each row from 1 and taking the square root.

$$H = \begin{pmatrix} 0.709 & 0.288 & 0.288 & 0.288 & 0.288 & 0.288 & 0.288 \\ 0.288 & 0.867 & 0.288 & 0 & 0 & 0 & 0.288 \\ 0.288 & 0.288 & 0.867 & 0.288 & 0 & 0 & 0 \\ 0.288 & 0 & 0.288 & 0.867 & 0.288 & 0 & 0 \\ 0.288 & 0 & 0 & 0.288 & 0.867 & 0.288 & 0 \\ 0.288 & 0 & 0 & 0 & 0.288 & 0.867 & 0.288 \\ 0.288 & 0.288 & 0 & 0 & 0 & 0.288 & 0.867 \end{pmatrix} \quad (20)$$

When this determinant of matrix underwent singular value decomposition as Equation (5) shown above, matrix A, representing amplitude gains in Equation (6) shown above, was in a manner of Equation (21) shown below.

$$A = \begin{pmatrix} 1.87 & 0 & 0 & 0 & 0 & 0 & 0 \\ 0 & 1.16 & 0 & 0 & 0 & 0 & 0 \\ 0 & 0 & 1.16 & 0 & 0 & 0 & 0 \\ 0 & 0 & 0 & 0.58 & 0 & 0 & 0 \\ 0 & 0 & 0 & 0 & 0.58 & 0 & 0 \\ 0 & 0 & 0 & 0 & 0 & 0.29 & 0 \\ 0 & 0 & 0 & 0 & 0 & 0 & 0.28 \end{pmatrix} \quad (21)$$

When transmission bandwidth B of each core was set to 100 GHz, and ratio S/N of signal output and noise of each core in the aforementioned transmission distance was set to 40 (16 dB), maximum transmission capacity C was approximately 3054 Gbps by Equation (12) shown above.

In a single-core fiber similar to one in Example 2 except for having one core, when the transmission distance, transmission bandwidth, and ratio of signal output and noise are similar to those in Example 2, the maximum transmission capacity is 536 Gbps by Equation (13) shown above. Accordingly, it was found that the transmission capacity could be drastically increased in the optical fiber communication system using the multicore fiber in Example 2.

INDUSTRIAL APPLICABILITY

With the present invention, an optical fiber communication system restricting enlargement of the diameter of an optical fiber as well as enabling achievement of a large-capacity optical communication with a small number of optical fibers is provided.

DESCRIPTION OF REFERENCE NUMERALS

10 . . . Optical transmitter
11 . . . Signal generating section
12 . . . Light source section
20, 25, 27 . . . Multicore fiber
21, 21a, 21b, 21c, 21d . . . Core
22 . . . Clad
23 . . . Inner protective layer
24 . . . Outer protective layer
30 . . . Optical receiver
31 . . . Light receiving section
32 . . . Signal processing section
40 . . . Information creating section
100, 200 . . . Optical fiber communication system

The invention claimed is:
1. An optical fiber communication system comprising:
an optical transmitter transmitting a plurality of optical signals in parallel, a multicore fiber in which outer circumferences of a plurality of cores are covered with a common clad, and the respective optical signals transmitted in parallel from the optical transmitter are input into the cores such that different optical signals are couple to different cores of the multicore fiber; and an optical receiver receiving the optical signals output in parallel from the respective cores of the multicore fiber, wherein the optical transmitter and the optical receiver perform a MIMO communication, wherein each of the plurality of cores includes a unique transmission path characteristic including a crosstalk among the plurality of cores of the multicore fiber, wherein the optical receiver stores information of the unique transmission path characteristic of the each of the plurality of cores, and the optical receiver obtains signals transmitted from the optical transmitter from the received optical signals by using the information of the transmission path characteristic, wherein the optical transmitter transmits a known pilot signal through the respective cores of the multicore fiber, and wherein the optical receiver receives the known pilot signal transmitted by the optical transmitter, compares the received pilot signal and the known pilot signal to generate the information of the unique transmission path characteristic, and updates the stored information of the unique transmission path characteristic by the generated information of the unique transmission path characteristic.

2. The optical fiber communication system according to claim 1, wherein the optical receiver prestores the information of the transmission path characteristics.

3. The optical fiber communication system according to claim 1, wherein the optical transmitter and the optical receiver store in common information of transmission path characteristics of the multicore fiber, the optical transmitter transmits optical signals weighted for the respective a plurality of cores with use of the information of the transmission path characteristics, and the optical receiver obtains signals in a state before the weighting by the optical transmitter from the information of the transmission path characteristics and the received optical signals.

4. The optical fiber communication system according to claim 3, wherein the optical transmitter and the optical receiver prestore the information of the transmission path characteristics.

5. The optical fiber communication system according to claim 3, wherein the optical transmitter transmits a known pilot signal, and the optical transmitter and the optical receiver store the information of the transmission path characteristics generated by comparison between a received pilot signal and the known pilot signal.

6. The optical fiber communication system according to claim 5, wherein the information of the transmission path characteristics is generated at the optical receiver.

7. The optical fiber communication system according to any one of claims 1, 2, or 3 to 6 wherein the plurality of cores are arranged to be symmetric about a line passing a center on a cross-section perpendicular to a longitudinal direction of the multicore fiber.

8. The optical fiber communication system according to any one of claims 1, 2, or 3 to 6 wherein the adjacent cores of the multicore fiber have different refractive indexes.

9. The optical fiber communication system according to any one of claims 1, 2, 3 to 6 wherein the adjacent cores of the multicore fiber have different diameters.

* * * * *